(12) United States Patent
Moriguchi et al.

(10) Patent No.: US 8,746,406 B2
(45) Date of Patent: Jun. 10, 2014

(54) WHEEL LOADER

(75) Inventors: Kyousuke Moriguchi, Komatsu (JP); Hironori Torisu, Komatsu (JP); Eiji Yamaguchi, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/823,370

(22) PCT Filed: May 29, 2012

(86) PCT No.: PCT/JP2012/063688
§ 371 (c)(1),
(2), (4) Date: Mar. 14, 2013

(87) PCT Pub. No.: WO2013/168299
PCT Pub. Date: Nov. 14, 2013

(65) Prior Publication Data
US 2013/0327595 A1    Dec. 12, 2013

(30) Foreign Application Priority Data
May 9, 2012  (JP) .................................. 2012-107451

(51) Int. Cl.
*F16H 57/05* (2006.01)
*F16H 57/04* (2010.01)

(52) U.S. Cl.
CPC ................................... F16H 57/045 (2013.01)
USPC ...................................................... 184/6.12

(58) Field of Classification Search
USPC .............. 184/6, 6.5, 6.6, 6.9, 6.12, 7.4, 11.1; 123/196 R
See application file for complete search history.

(56) References Cited

U.S. PATENT DOCUMENTS

| | | | |
|---|---|---|---|
| 6,110,070 A * | 8/2000 | Nagai et al. ........................ 476/8 |
| 7,481,298 B2 * | 1/2009 | Yoshida et al. ............... 184/6.12 |
| 7,942,245 B2 * | 5/2011 | Shimizu et al. ................ 184/6.9 |
| 8,079,445 B2 * | 12/2011 | Aoyama et al. ............... 184/6.12 |
| 2005/0193965 A1 * | 9/2005 | Nakatsuka et al. ......... 123/41.44 |

FOREIGN PATENT DOCUMENTS

| EP | 2 177 387 A1 | 4/2010 |
|---|---|---|
| JP | 2-199352 A | 8/1990 |
| JP | 2-140039 U | 11/1990 |

(Continued)

OTHER PUBLICATIONS

International Search Report for PCT/JP2012/063688.

(Continued)

*Primary Examiner* — William E Dondero
*Assistant Examiner* — Robert T Reese
(74) *Attorney, Agent, or Firm* — Global IP Counselors, LLP

(57) ABSTRACT

A transmission for a wheel loader includes first and second oil accumulating parts, a communication oil path, a horizontal hole and a vertical hole. The first oil accumulating part accumulates scattered lubricating oil. The second oil accumulating part is mounted to an end of an output shaft below the first oil accumulating part, and accumulates the lubricating oil from the first oil accumulating part. The communication oil path allows the first and second oil accumulating parts to communicate with each other. The horizontal hole extending axially is formed in the rotary shaft, and communicates with the second oil accumulating part. The vertical hole communicating with the horizontal hole is formed in the output shaft, and directs the lubricating oil accumulated in the second oil accumulating part to the lubricated part when the output shaft is rotated at a rotational speed lower than a predetermined rotational speed.

4 Claims, 6 Drawing Sheets

(56) References Cited

FOREIGN PATENT DOCUMENTS

| JP | 3-72150 U | 7/1991 |
| JP | 6-249324 A | 9/1994 |
| JP | 2001-227563 A | 8/2001 |
| JP | 2001-280453 A | 10/2001 |
| JP | 2006-292086 A | 10/2006 |
| JP | 2010-174971 A | 8/2010 |
| JP | 2011-163479 A | 8/2011 |

OTHER PUBLICATIONS

The European Search Report for the corresponding international application No. 12840862.2, issued on Apr. 11, 2014.

* cited by examiner

WHEEL LOADER

CROSS-REFERENCE TO RELATED APPLICATIONS

This application claims priority to Japanese Patent Application No. 2012-107451, filed on May 9, 2012, the disclosure of which is hereby incorporated herein by reference in its entirety.

TECHNICAL FIELD

The present invention relates to a wheel loader, and particularly to a wheel loader executing a work with repetition of travelling and stopping.

BACKGROUND ART

A wheel loader is a vehicle for mainly executing an excavation work and includes a vehicle body frame, a working unit, front and rear tires, a cab and etc. Further, the vehicle body frame includes a front frame, a rear frame and a coupling part. The front frame is coupled to the rear frame through the coupling part, while being allowed to turn in the right-and-left direction.

Such wheel loader includes a hydraulic transmission for executing switching between forward travelling and rearward travelling and gear shifting. Further, the transmission is provided with rotary shafts such as an input shaft, an intermediate shaft and an output shaft, hydraulic clutch devices attached to these shafts, gears, a parking brake and etc.

Thus, a friction part including a clutch device and a brake device, a slide part such as a bearing, and an engaged part using a spline are disposed inside the transmission. Therefore, it is required to supply lubricating oil to these components.

In view of this, a hydraulic system as described in Japan Laid-open Patent Application Publication No. JP-A-2010-174971 and a structure as described in Japan Laid-open Patent Application Publication No. JP-A-2001-227563 have been provided.

The hydraulic system described in Japan Laid-open Patent Application Publication No. JP-A-2010-174971 is provided with a transmission lubricating circuit branched from a high pressure circuit for supplying an operating oil to a clutch, and is further provided with a transmission lubrication backup circuit branched from a steering lubricating circuit. The transmission lubrication backup circuit is connected to the transmission lubricating circuit. Further, the oil used for lubrication by these circuits is accumulated in a transmission case and is then returned to a steering device.

On the other hand, the transmission described in Japan Laid-open Patent Application Publication No. JP-A-2001-227563 is configured to forcibly lubricate the clutch by means of a drain oil of a power steering mechanism in order to implement clutch lubrication at a low cost.

Further, Japan Laid-open Patent Application Publication No. JP-A-H06-249324 describes arrangement of a tub located above an automatic gear shifting device as a fueling device of the automatic gear shifting device in order to collect the lubricating oil upwardly stirred by gears within the transmission. The lubricating oil, collected by the tub, is then configured to be supplied to respective slide parts by the action of gravity.

SUMMARY

In transmissions for wheel loaders, as described in Patent Literatures 1 and 2, respective components attached onto the input shaft are often lubricated by means of the lubricating oil forcibly supplied thereto by pumps. It could be also assumed that an output part including an output shaft and etc. is forcibly lubricated similarly to the above. In this case, however, it is required to increase the volume of an oil pump for supplying lubricating oil and cost is increased by providing an additional circuit.

In view of the above, natural lubrication is often executed for a spline engaged part such as an output shaft disposed on the bottom part of a transmission case by upwardly stirring and scattering lubricating oil accumulated on the bottom part of the case through gear rotation and etc.

Now, wheel loaders often execute works at a low speed. Especially in such situation that a work is executed at a low speed for a long period of time, sufficient lubricating oil is not easily supplied to respective components by means of conventional natural lubrication. Especially, a parking brake of a wheel loader is attached to an end portion of a case of a transmission. Therefore, a brake plate and a spline engaged part, which form a parking brake device, cannot be sufficiently lubricated by means of the conventional natural lubrication.

It is required to raise the oil surface level of the lubricating oil within the case to the height of the spline engaged part in order to well lubricate the spline engaged part and etc. by means of the conventional natural lubrication. In such structure, however, stirring resistance by a rotary member is increased in the lubricating oil and power loss is increased.

It is an object of the present invention to achieve sufficient supply of the lubricating oil to respective components by means of natural lubrication in a transmission for a wheel loader.

A V-shape work is known as a representative work to be executed by a wheel loader of the present invention. The V-shape work is a type of work described as follows.

In short, an excavation work is executed in a given position, and subsequently, a load such as earth and sand, put in a bucket, is lifted up by elevating a boom while the vehicle is moved rearwards. Subsequently, the transmission is switched from rearward travelling to forward travelling, and the boom is further lifted up while the vehicle is moved forwards for approaching a dump truck. Then, the bucket is dumped for discharging the earth and sand onto the dump truck. Subsequently, the vehicle is moved back and forth without being loaded and is again returned to the excavation position.

As described above, during execution of the V-shape work, the vehicle speed is alternately transitioned back and forth across a given vehicle speed (hereinafter referred to as "a boundary vehicle speed") between a vehicle speed less than the boundary vehicle speed and a vehicle speed greater than or equal to the boundary vehicle speed.

In view of the above, through the utilization of a characteristic work of a wheel loader, the present invention is configured to execute such lubrication that is natural lubrication but is similar to forced lubrication.

In short, a wheel loader according to a first aspect of the present invention includes an engine, a working unit and a transmission executing switching between forward travelling and rearward travelling and gear shifting. The working unit is configured to be driven by means of a pressurized oil to be produced by driving of the engine. The transmission includes a case and a rotary shaft disposed inside the case and a lubricated part disposed on an outer peripheral part of the rotary shaft. The transmission includes a first oil accumulating part, a second oil accumulating part, a communication oil path, a horizontal hole and a lubrication oil path. The first oil accumulating part is disposed above the lubricated part and accumulates a scattered lubricating oil. The second oil accumulating part is mounted to an end of the rotary shaft while being disposed below the first oil accumulating part, and accumulates the lubricating oil from the first oil accumulating part. The communication oil path makes the first oil accumulating part and the second oil accumulating part communicate with each other. The horizontal hole is formed in the rotary shaft while being axially extended, and communicates with the second oil accumulating part. The lubrication oil path has a vertical hole that is formed in the rotary shaft while being radially extended from an outer peripheral surface of the rotary shaft, and communicates with the horizontal hole. Further, the lubrication oil path is configured to direct the lubricating oil accumulated in the second oil accumulating part to the lubricated part when the rotary shaft is rotated at a rotational speed lower than a predetermined rotational speed.

The term "predetermined rotational speed" herein refers to a rotational speed determined by the relation in magnitude between the potential energy of the first oil accumulating part with respect to the second oil accumulating part and the kinetic energy of the lubricating oil within the second oil accumulating part (which is generated by centrifugal force) due to rotation of the output shaft. Specifically, when the kinetic energy is greater than the potential energy, the lubricating oil within the second oil accumulating part is pressed onto a circumferential wall portion of the second oil accumulating part and is accordingly pushed back within the communication oil path without being supplied into the horizontal hole. As described above, the threshold rotational speed at which the kinetic energy becomes greater than the potential energy is "predetermined rotational speed".

In the present wheel loader, the lubricating oil scattered within the case of the transmission is accumulated in the first oil accumulating part in such situation as when the vehicle is travelling. Then, during execution of a V-shape work of the wheel loader, when the vehicle speed is less than a predetermined vehicle speed, i.e., when the rotational speed of the rotary shaft is less than a predetermined rotational speed, the lubricating oil accumulated in the first oil accumulating part is directed to the second oil lubricating part disposed below the first oil accumulating part by means of the action of gravity, and is further supplied to the lubricated part through the lubrication oil path having the horizontal hole and the vertical hole.

Despite natural lubrication, the lubricating oil is herein forcibly supplied to the lubricated part by utilizing the potential energy of the lubricating oil accumulated in the first oil accumulating part at a low speed during execution of a V-shape work of the wheel loader. Therefore, the lubricating oil can be supplied to a position to which the lubricating oil cannot be easily supplied by means of natural lubrication.

A wheel loader according to a second aspect of the present invention relates to the wheel loader of the first aspect, and wherein the rotary shaft is an output shaft disposed on a bottom part of the case and the first oil accumulating part has a predetermined length along an axial direction of the output shaft. Further, the communication oil path is formed in the case.

Here, the lubricating oil accumulated in the first oil accumulating part is directed to the second oil accumulating part through the communication oil path formed in the case. In this case, it is not required to externally dispose a pipe for making the both oil accumulating parts communicate with each other.

A wheel loader according to a third aspect of the present invention relates to the wheel loader of the second aspect, and wherein the transmission further includes an output flange spline-engaged with an end of the output shaft. Further, the second oil accumulating part is an shaft end space produced between an end surface of the end of the output shaft and a cap that is fixed to the output flange while being disposed axially away from the end surface of the output shaft at a predetermined clearance. The horizontal hole is formed in a center part of the output shaft.

Here, the second oil accumulating part is formed by utilizing the space existing on the shaft end portion of the output shaft. Therefore, a special space is not required.

A wheel loader according to a fourth aspect of the present invention relates to the wheel loader of the third aspect, and wherein the transmission further includes a parking brake that is attached to a lateral part of the case while being spline-engaged with the output shaft. Further, the vertical hole makes the horizontal hole and a spline engaged part of the parking brake communicate with each other.

In many cases, no input-side mechanism and/or member is disposed above the parking brake that is attached to the lateral part of the case while being spline-engaged with the outputs shaft. Therefore, it is difficult to supply the lubricating oil to the parking brake by means of natural lubrication.

In view of the above, according to the wheel loader of the fourth aspect, the lubricating oil is configured to be supplied to the spline-engaged part of the parking brake through the vertical hole.

A wheel loader of a fifth aspect of the present invention relates to the wheel loader of any of the first to fourth aspects, and wherein the first oil accumulating part is integrally formed with an inner wall of the case and forms a U-shaped cross section together with the inner wall.

Here, the first oil accumulating part is formed by utilizing the inner wall of the case. Therefore, the first oil accumulating part can be formed with a simple structure.

A wheel loader according to a sixth aspect relates to the wheel loader of any of the second to fifth aspects, and wherein the transmission further includes an input mechanism that has a rotary shaft and a gear above the output shaft and is supplied with the lubricating oil. Further, the first oil accumulating part accumulates a scattered oil from the input mechanism and a scattered oil upwardly stirred from the case bottom part.

In general, the input mechanism is often forcibly lubricated. Further, the lubricating oil used for lubrication of the input mechanism drops on the case bottom part or is scattered by the rotary member.

In view of the above, the lubricating oil in the aforementioned situations is configured to be accumulated in the first oil accumulating part. Therefore, the lubricating oil can be efficiently accumulated in the first oil lubricating part, and as a result, the output shaft part can be well lubricated.

A lubrication method of a transmission for a wheel loader according to the present invention is a method of lubricating the wheel loader transmission including a first oil accumulating part, a second oil accumulating part and a lubricated part. The first oil accumulating part is mounted on an inner wall of a case of the transmission. The second oil accumulating part is mounted on an end of a rotary shaft disposed below the first oil accumulating part while communicating with the first oil accumulating part through a communication path. The lubricated part is disposed on an outer peripheral part of the rotary shaft. Further, the lubrication method includes the following steps.

A step of accumulating a scattered lubricating oil in the first oil accumulating part.

A step of directing the lubricating oil to the lubricated part through the second oil accumulating part by means of a potential energy of the lubricating oil accumulated in the first oil accumulating part when the rotary shaft is rotated at a rotational speed lower than a predetermined rotational speed.

It should be noted that the term "predetermined rotational speed" in the lubrication method is similar to the aforementioned rotational speed.

ADVANTAGEOUS EFFECTS OF INVENTION

As described above, according to the present invention, lubricating oil can be sufficiently supplied to respective components in a transmission for a wheel loader by means of natural lubrication utilizing gravity.

DESCRIPTION OF THE EMBODIMENTS

Overall Structure of Wheel Loader

Figure 1:
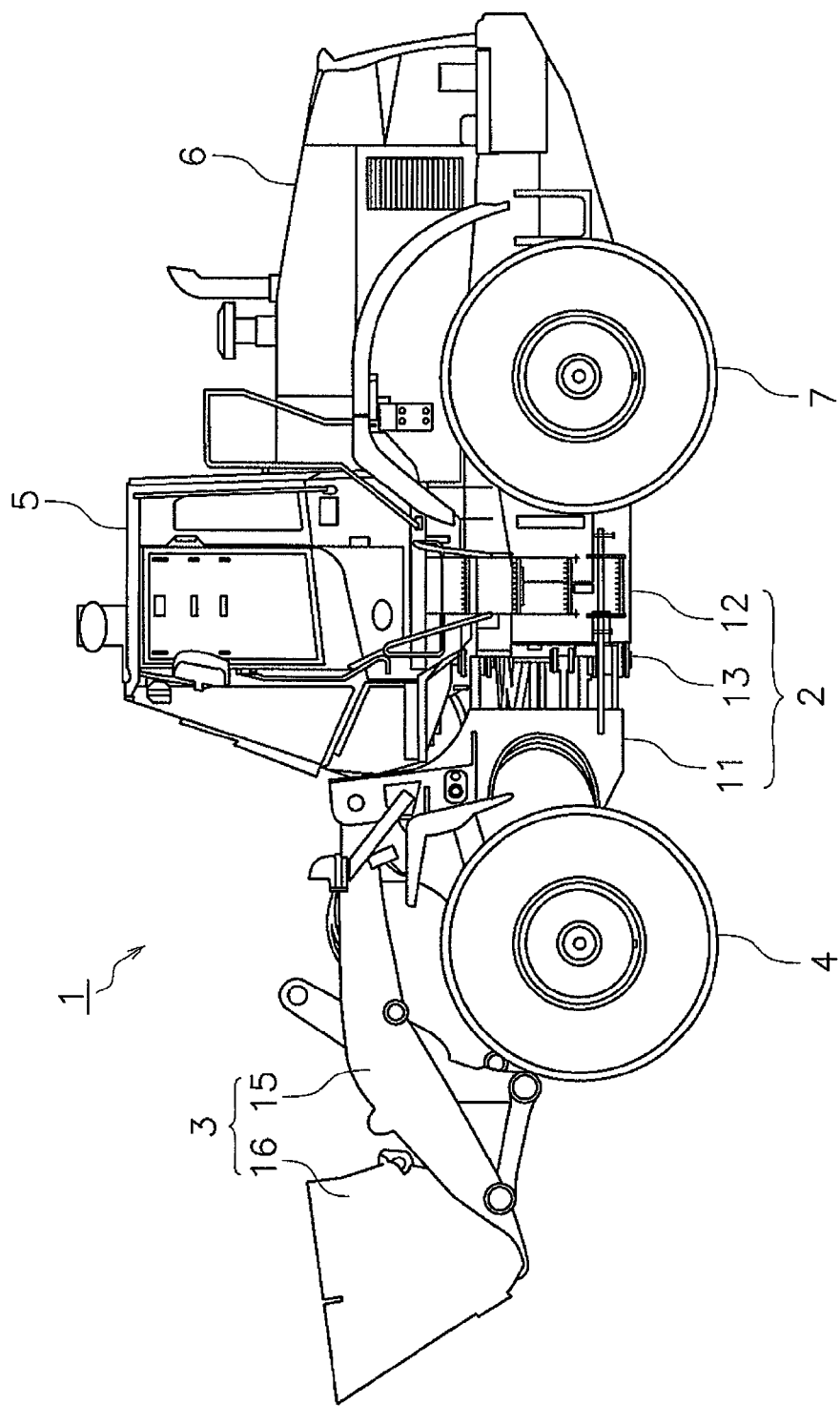
FIG. 1 is a side view of a wheel loader according to an exemplary embodiment of the present invention.

FIG. 1 illustrates an entire structure of a wheel loader 1 according to an exemplary embodiment of the present invention. It should be noted that FIG. 1 is a side view of the wheel loader 1.

The wheel loader 1 includes a vehicle body frame 2, a working unit 3, a pair of front tires 4, a cab 5, an engine compartment 6 and a pair of rear tires 7.

The vehicle body frame 2 has so-called an articulated structure and includes a front frame 11, a rear frame 12 and a coupling part 13. The front frame 11 is disposed forwards of the rear frame 12 and is coupled to the rear frame 12 through the coupling part 13 while being allowed to turn in the right-and-left direction. A drive train, including an engine, a transmission and etc., is installed in the rear frame 12.

The working unit 3 includes a lift arm 15 and a bucket 16. The lift arm 15 and the bucket 16 are driven by means of pressurized oil to be supplied thereto from a hydraulic pump (not illustrated in the figures). The base end of the lift arm 15 is rotatably supported by the front frame 11. The bucket 16 is rotatably attached to the distal end portion of the lift arm 15.

The cab 5 is mounted on the rear frame 12, and a handle for a steering operation, a joystick, an operating member for operating the working unit, a variety of display devices and etc. are disposed inside the cab 5.

Transmission

Overall Structure

The transmission installed in the present wheel loader serves to transmit torque, which is inputted thereto from two hydraulic motors, to an output shaft. Specifically, the transmission includes first and second hydraulic motors. The first hydraulic motor is coupled to a first input shaft through a clutch mechanism, while the second hydraulic motor is directly coupled to a second input shaft. Further, the first input shaft is provided with a planetary gear mechanism having a large reduction ratio.

Further, when a large torque is required in executing a work and etc., the clutch mechanism is turned on and torque is inputted into the transmission from the first and second hydraulic motors through the input shafts to which the first and second hydraulic motors are respectively coupled. On the other hand, in such a case of high speed travelling, the clutch mechanism mounted on the first input shaft is turned off and torque is inputted into the transmission only from the second hydraulic motor for high speed travelling through the second input shaft.

Figure 2:
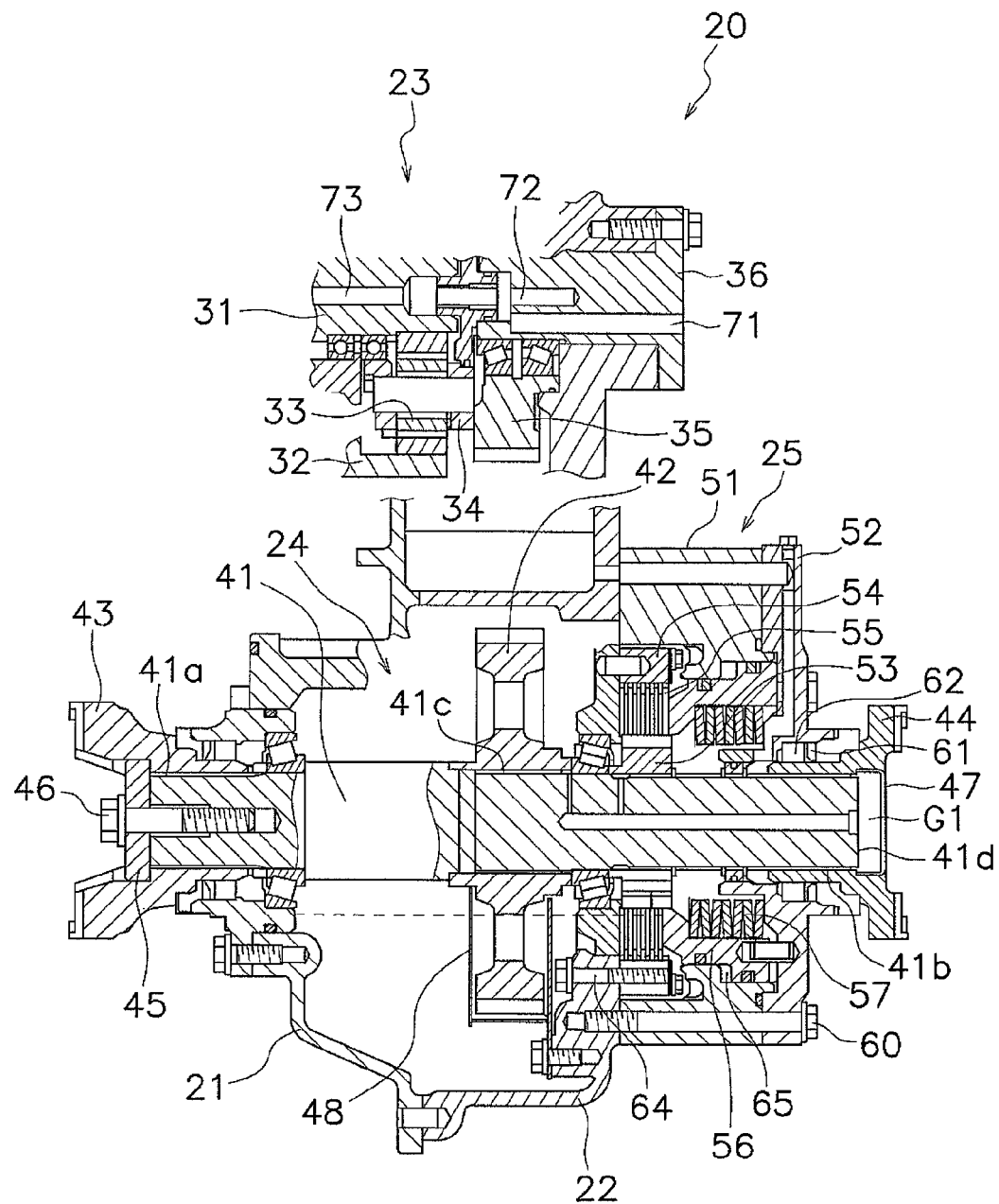
FIG. 2 is a partial cross-sectional view of a transmission.

The entire structure of the transmission will be hereinafter explained using FIG. 2. As illustrated in FIG. 2, a transmission 20 includes a front case 21, a rear case 22, an input part 23 accommodated in the cases 21 and 22, an output part 24 and a parking brake 25 attached to the rear part of the rear case 22.

Input Part

As described above, the input part 23 includes two hydraulic motors and two gear shifting mechanisms. Each of the two gear shift mechanisms includes an input shaft and a gear mechanism for gear shifting and transmits torque from its corresponding hydraulic motor to the output shaft. FIG. 2 partially illustrates one of the two gear shifting mechanisms. The gear shifting mechanism illustrated in FIG. 2 includes a first input shaft 31, the clutch mechanism (not illustrated in the figures), a planetary gear mechanism (only partially illustrated) and an input gear 35.

The first input shaft 31 is coupled to the output shaft of the first hydraulic motor (not illustrated in the figures) through a spline engagement. Further, the torque inputted into the first input shaft 31 is inputted into a ring gear 32 of the planetary gear mechanism through the clutch mechanism (not illustrated in the figures). A plurality of planet gears 33 are meshed with the ring gear 32, while being rotatably supported by a carrier 34. The input gear 35 is fixed to the carrier 34. The input gear 35 is rotatably supported through a bearing by an end cover 36 fixed to the rear case 22.

Output Part

The output part 24 includes an output shaft 41 and an output gear 42.

The output shaft 41 is disposed on the bottom parts of the cases 21 and 22. One end of the output shaft 41 is rotatably supported by the front case 21 through a bearing, while an axially intermediate part thereof is rotatably supported by the rear case 22 through a bearing. A first spline 41a for flange engagement is formed on the outer peripheral surface of the one end of the output shaft 41. Similarly, a second spline 41b for flange engagement is formed on the outer peripheral surface of the other end of the output shaft 41. The second spline 41b has an axial length greater than that of the first spline 41a. Further, a third spline 41c for gear engagement is formed on the axially intermediate part of the output shaft 41.

A first output flange 43 is spline-engaged with the first spline 41a of the output shaft 41, while a second output flange 44 is spline-engaged with the second spline 41b. The first output flange 43 is fixed to one end surface of the output shaft 41 by means of a plate 45 and a bolt 46. Further, a cap 47 is fitted into an opening of the second output flange 44, while a predetermined clearance G1 is produced between the cap 47 and the other end surface 41d of the output shaft 41.

The output gear 42 is spline-engaged with the third spline 41c. The input gear 35 illustrated in FIG. 2 and another input gear (not illustrated in the figures) are meshed with the output gear 42. It should be noted that a baffle plate 48 is disposed for enclosing the surrounding of the lower part of the output gear 42.

Parking Brake

The parking brake 25 is attached to a lateral surface of the rear case 22 on the second output flange 44 side. The parking brake 25 includes a housing 51, a cover 52, a hub 53, a stationary ring 54, a plurality of brake plates 55, a piston 56 and a plurality of disc springs 57.

The housing 51 is formed in a roughly ring shape and is fixed to a lateral surface of the rear case 22 together with the cover 52 by means of a plurality of bolts 60. The cover 52 is fixed to an end surface of the housing 51. A dust seal 61 and an oil seal 62 are mounted between the inner peripheral part of the cover 52 and the outer peripheral surface of the second output flange 44. It should be noted that the dust seal 61 and the oil seal 62 are similarly disposed on the first output flange 43 side.

The hub 53, the stationary ring 54, the plural brake plates 55, the piston 56 and the plural disc springs 57 are accommodated in the space formed by the housing 51 and the cover 52 as described above.

The hub 53 is formed in a ring shape and a spline formed on the inner peripheral surface thereof is spline-engaged with the second spline 41b of the output shaft 41. Further, the hub 53 has a plurality of teeth on the outer peripheral surface thereof.

The stationary ring 54 is fixed to a lateral surface of the rear case 22 by means of a bolt 64 while being disposed on the outer peripheral side of the hub 53. The stationary ring 54 has a plurality of teeth on the inner peripheral surface thereof.

The plural brake plates 55 include a first plate to be engaged with the hub 53 and a second plate to be engaged with the stationary ring 54. In other words, the first plate has a plurality of teeth on the inner peripheral part thereof, and the teeth are meshed with the teeth formed on the outer peripheral surface of the hub 53. Further, the second plate has a plurality of teeth formed on the outer peripheral part thereof, and the teeth are meshed with the teeth formed on the inner peripheral surface of the stationary ring 54. Friction members are disposed on the both lateral surfaces of the first plate.

The piston 56 is formed in a ring-like and tube-like shape and is disposed movably in the axial direction along the inner peripheral surface of the housing 51. An oil chamber 65, supplied with the operating oil for actuating the piston 56, is formed between the outer peripheral surface of the piston 56 and the inner peripheral surface of the housing 51.

The plural disc springs 57 are disposed in the inner periphery of the piston 56 while being disposed between the piston 56 and the cover 52. The plural disc springs 57 are set in a compressed state. Therefore, while the operating oil is not being supplied to the oil chamber 65, the piston 56 causes the plural first and second plates to be pressed against each other by the plural disc springs 57.

In the parking brake 25 structured as described above, braking is turned on and rotation of the output shaft 41 is braked, while oil chamber 65 is not supplied with the operating oil. On the other hand, the piston 56 is moved to a side away from the plural brake plates 55 when the oil chamber 65 is supplied with the operating oil. Therefore, the first and second plates, forming the brake plates 55, are released from pressing against each other and braking is turned off. In the state, braking with respect to the output shaft 41 is released.

Lubrication Mechanism

Figure 3:
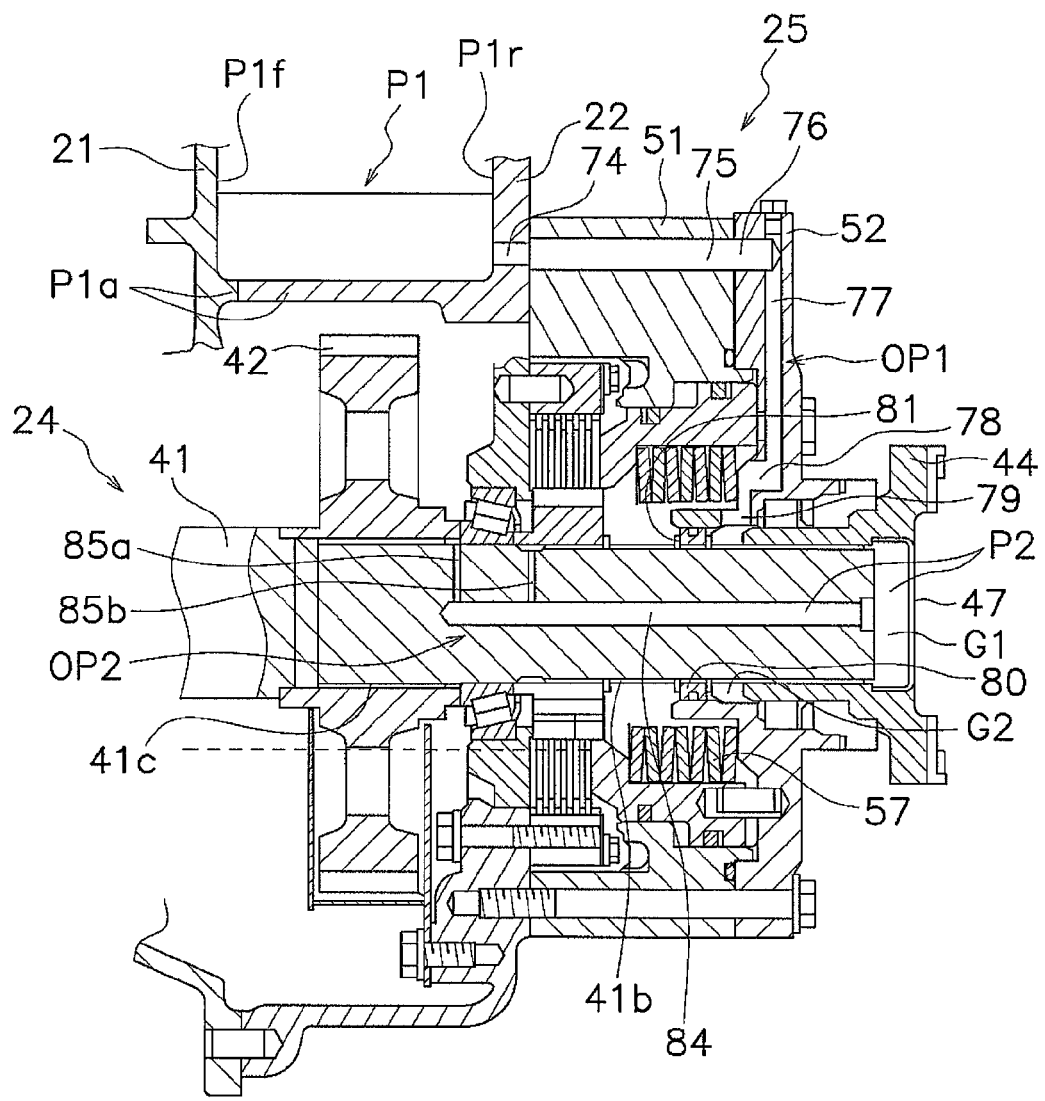
FIG. 3 is a cross-sectional view of a lubrication mechanism of the transmission.

FIG. 3 illustrates a part extracted from the lubrication mechanism mounted to the transmission 20. In the present exemplary embodiment, the input part 23 is forcibly lubricated by means of the lubricating oil to be supplied from an oil pump. On the other hand, the output part 24 is lubricated by means of the lubricating oil fallen or scattered from the input part 23 and the lubricating oil scattered by the output gear 42 and etc. The lubrication structure will be hereinafter specifically explained.

As illustrated in FIG. 2, a first hole 71 for supplying lubricating oil is axially formed in the end cover 36. The first hole 71 is communicated with a second hole 72 formed coaxially with the center axis of the first input shaft 31. The lubricating oil, supplied from the oil pump (not illustrated in the figures) through these holes 71 and 72, is supplied to the bearings and slide portions through clearances formed among respective components and holes formed in the radial direction. Further, the first input shaft 31 also has a third hole 73 axially formed in the center part thereof, and the lubricating oil is supplied to the clutch mechanism and etc. mounted to the first input shaft 31 through the third hole 73 and the radially formed holes (not illustrated in the figures).

As illustrated in FIG. 3, a first oil accumulating part P1, a second oil accumulating part P2, a horizontal hole 84, and oil paths OP1 and OP2 for lubrication are provided for lubricating the output part 24.

Figure 4:
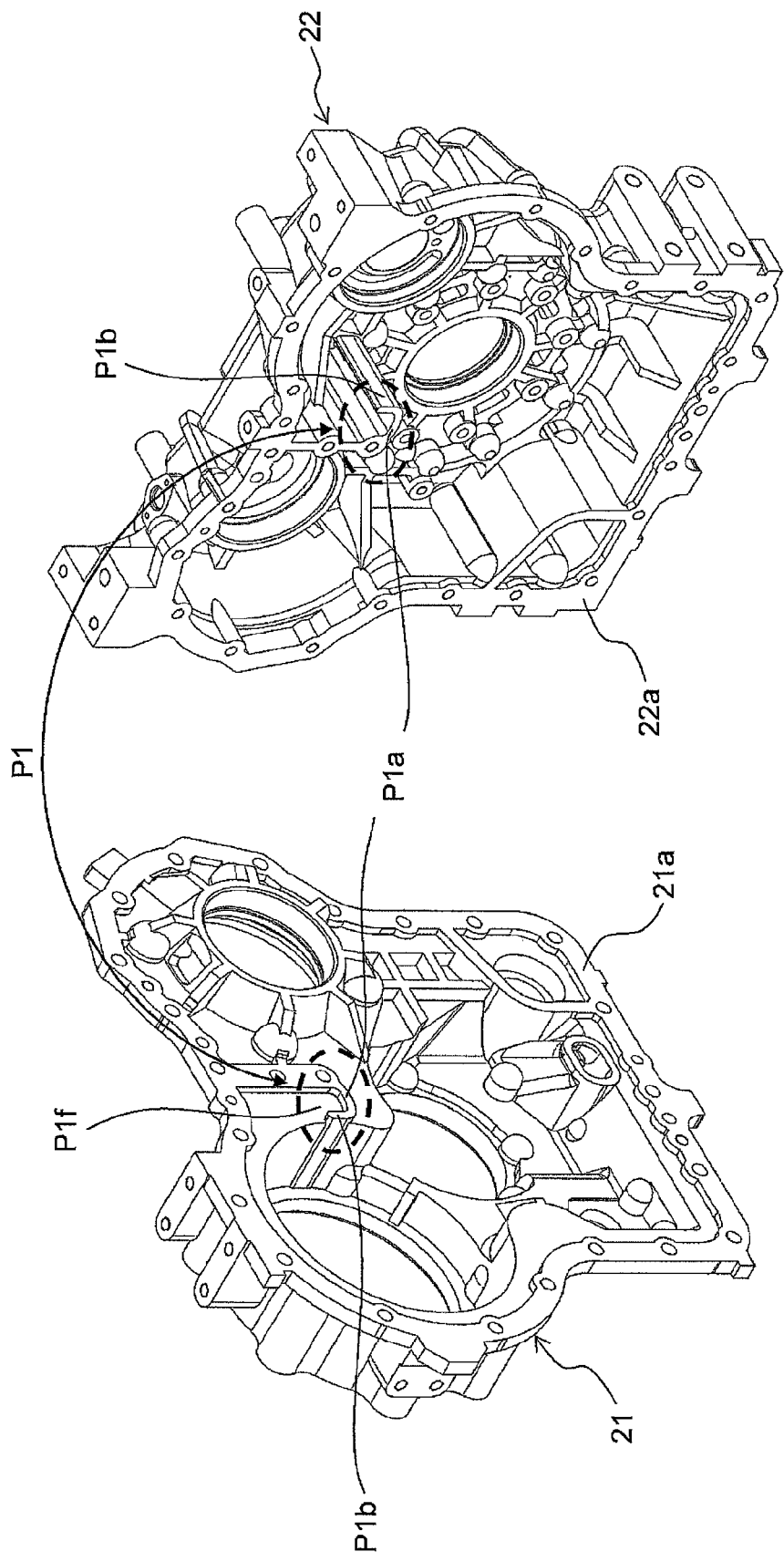
FIG. 4 is an external perspective view of a front case and a rear case.

The first oil accumulating part P1 is a part for mainly accumulating the lubricating oil supplied to and scattered from the input part 23. As illustrated in FIGS. 3 and 4, the first oil accumulating part P1 is integrally formed with the inner wall of the front case 21 and that of the rear case 22 and forms a U-shaped cross section together with the inner walls. When explained in more detail, a part of a bottom portion P1a, a part of a lateral portion P1b and a front wall P1f of the first oil accumulating part P1 are formed in the front case 21. Further, a large part of the bottom portion P1a, a large part of the lateral portion P1b and a rear wall P1r of the first oil accumulating part P1 are formed in the rear case 22. Then, in matching the front case 21 and the rear case 22 to each other at mating surfaces 21a and 22a, the first oil accumulating part P1 having a U-shaped cross section is formed by the bottom portion P1a, the lateral portion P1b, the case inner wall surface and the front and rear walls P1f and p1r. It should be noted that a fourth hole 74 is formed in the lower part of the rear wall P1r while axially penetrating therethrough.

As described above, the second oil accumulating part P2 is the clearance G1 produced between the cap 47 attached to the second output flange 44 and the end surface 41d of the output shaft 41.

The horizontal hole 84 is formed along the axial direction in the center part of the output shaft 41 and has a predetermined depth from one end surface 41d of the output shaft 41. In other words, one end of the horizontal hole 84 is opened to the clearance G1.

The oil paths for lubrication include: the communication oil path OP1 for directing the lubricating oil accumulated in the first oil accumulating part P1 to the second oil accumulating part P2; and the supply oil path OP2 for directing the lubricating oil accumulated in the second oil accumulating part P2 to respective components.

The communication oil path OP1 includes the aforementioned fourth hole 74 and fifth to ninth holes 75 to 79. The fifth hole 75 is formed in the housing 51 of the parking brake 25 while being axially penetrating therethrough, and is communicated with the fourth hole 74. The sixth hole 76 is formed in the cover 52 of the parking brake 25 along the axial direction while being communicated with the fifth hole 75. The sixth hole 76 is formed at a predetermined depth from the mating surface of the housing 51. The seventh hole 77 is formed in the cover 52 along the radial direction, while having a predetermined depth from the outer peripheral surface of the cover 52 to the inner peripheral side. The sixth hole 76 is communicated with an intermediate part of the seventh hole 77. The eighth hole 78 is axially formed at a predetermined depth from the cover 52 surface supporting the disc springs 57, while being communicated with the seventh hole 77. The ninth hole 79 is communicated with the eighth hole 78 and the inner peripheral part of the cover 52.

A predetermined space G2 is produced in a part to which the ninth hole 79 is opened. Specifically, the space G2 having an annular shape is formed by the outer peripheral surface of the output shaft 41, the tip end surface of the second output flange 44 and a seal member 80 disposed on the inner peripheral part of the cover 52. The ninth hole 79 is communicated with the space G2.

It should be noted that a snap ring 81 is mounted to an end surface of the seal member 80 for inhibiting the lubricating oil accumulated in the space G2 from leaking towards the seal member 80 through the second spline 41b of the output shaft 41.

Further, the spline inner teeth of the second output flange 44 is partially removed, and a toothless portion is thus formed therein. The clearance G1 and the space G2 are communicated mainly through a clearance produced by the toothless portion and the output shaft 41.

The supply oil path OP2 includes first and second vertical holes 85a and 85b. The first vertical hole 85a is radially formed in the axially intermediate part of the output shaft 41. At an end portion of the output gear 42, the first vertical hole 85a makes the outer peripheral surface of an end portion of the third spline 41c of the output shaft 41 and the horizontal hole 84 communicate with each other. The second vertical hole 85b is radially formed while being disposed laterally to the first vertical hole 85a. At the inner peripheral surface of the hub 53, the second vertical hole 85b makes the outer peripheral surface of an end portion of the second spline 41b of the output shaft 41 and the horizontal hole 84 communicate with each other.

Lubrication of Output Part

Particularly, a lubrication action of the output part 24 will be herein explained where a V-shape work is being executed.

The V-shape work is as described above, and FIG. 5 represents transition in the vehicle speed during execution of a V-shape work. In this example represented in FIG. 5, one cycle of works (1) to (4) is executed roughly in 30 seconds. Specifically, in Step (1), the vehicle is forwardly moved without being loaded and executes an excavation work. In Step (2), the vehicle is backwardly moved while lifting up a load such as earth and sand within the bucket. In Step (3), the vehicle is forwardly moved while holding the load, then approaches a dump truck and discharges the earth and sand onto the dump truck. In Step (4), the vehicle is backwardly moved without being loaded, changes a travel direction thereof and is returned to the excavation position again.

Figure 5:
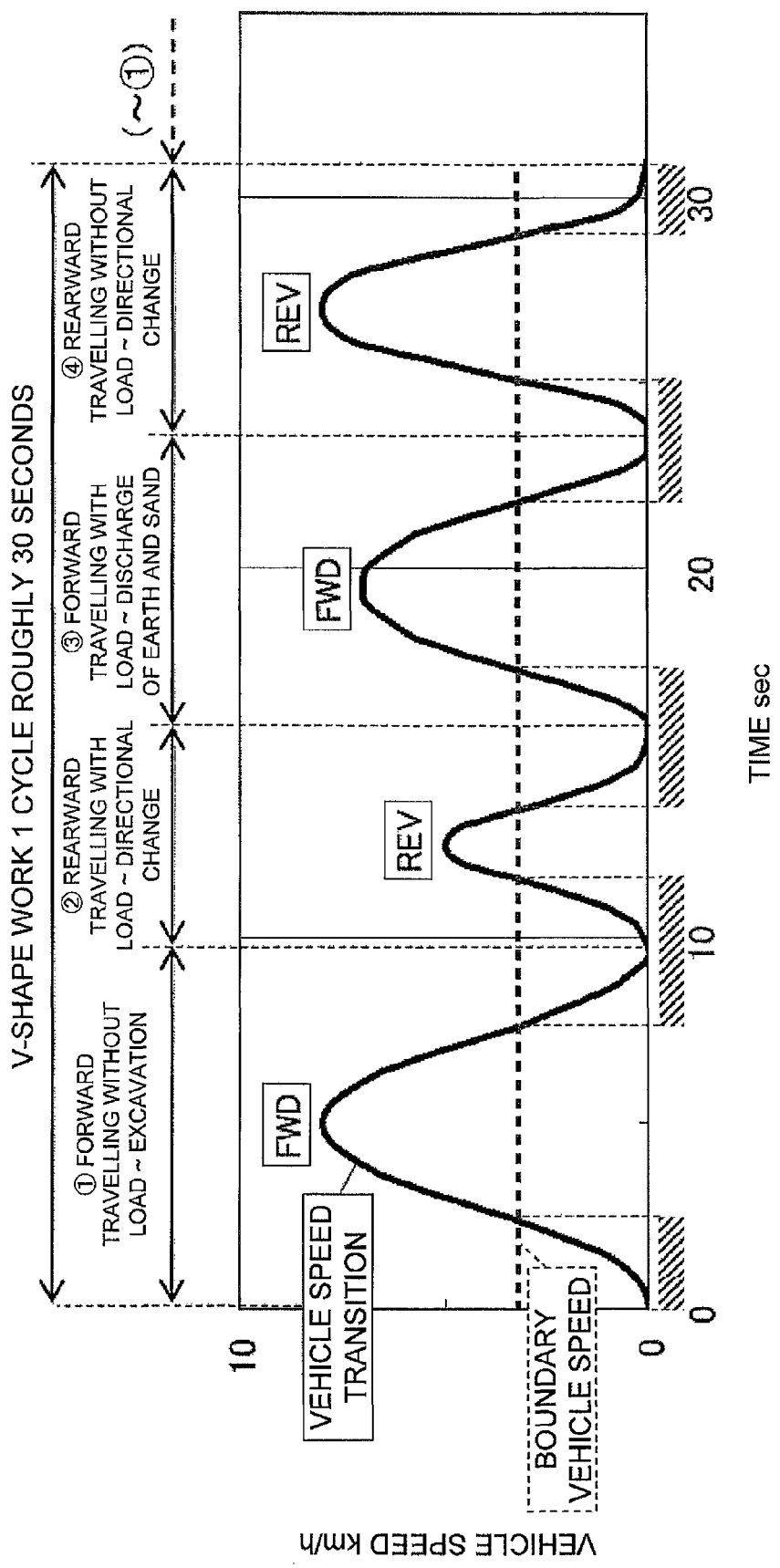
FIG. 5 is a diagram representing transition of the vehicle speed of the wheel loader during execution of a V-shape work.

As represented in FIG. 5, during execution of a V-shape work as described above, the vehicle speed is alternately transitioned back and forth across a boundary vehicle speed between a low speed lower than the boundary vehicle speed and a vehicle speed higher than or equal to the boundary vehicle speed. The boundary vehicle speed is a vehicle speed at which a balance is produced between the centrifugal force (kinetic energy) generated in the lubricating oil accumulated in the second oil accumulating part P2 by means of rotation of the output shaft 41 and the potential energy of the lubricating oil accumulated in the first oil accumulating part P1. Respective components are herein supposed to be lubricated in shaded regions in FIG. 5, i.e., in periods of time when the vehicle travels at a vehicle speed lower than the boundary vehicle speed. Therefore, lubrication is supposed to be effective for roughly half of the time during execution of a V-shape work of 30 seconds per cycle.

The boundary vehicle speed will be explained in more detail. The lubricating oil accumulated in the first oil accumulating part P1 is directed to the second oil accumulating part P2 through the respective holes 74 to 79, the clearance G2 and the second spline 41b. Then, respective components are lubricated by the lubricating oil accumulated in the second oil accumulating part P2 through the horizontal hole 84 and the two vertical holes 85a and 85b. In this case, the pressure of making the lubricating oil flow towards the respective components is the potential energy of the lubricating oil accumulated in the first oil accumulating part P1 (hereinafter referred to as "a supply head of the lubricating oil").

On the other hand, when the output shaft 41 is rotated, centrifugal force acts on the lubricating oil accumulated in the second oil accumulating part P2. When the rotational speed of the output shaft 41 then becomes greater than or equal to a predetermined rotational speed, the centrifugal force acting on the lubricating oil in the second oil accumulating part P2 (hereinafter referred to as "centrifugal hydraulic pressure") becomes greater than the supply head of the lubricating oil. Accordingly, the lubricating oil is moved to the outer peripheral part in the clearance G1 of the second oil accumulating part P2, and thereby, the lubricating oil no longer exists in the center part of the clearance G1 and the horizontal hole 84.

The boundary vehicle speed is the vehicle speed where the supply head of the lubricating oil and the centrifugal hydraulic pressure of the lubricating oil in the second oil accumulating part P2 (the clearance G1) are equal to each other (the rotational speed of the output shaft 41) under such condition as described above.

Figure 6:
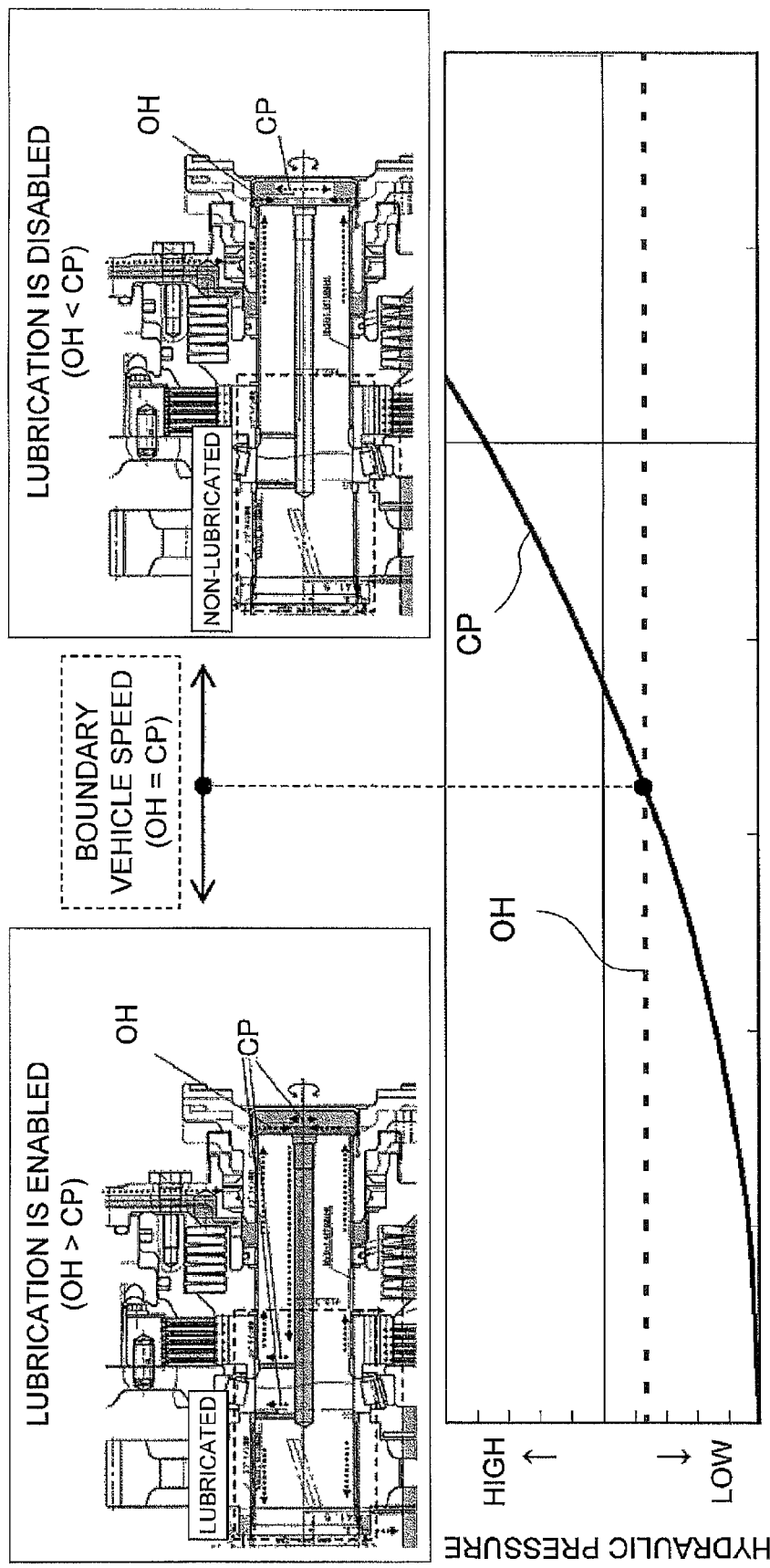
FIG. 6 is a diagram representing a relation between vehicle speed and lubricating oil supply.

FIG. 6 represents a relation between the vehicle speed and the lubricating oil supply. In FIG. 6, OH indicates the supply head of the lubricating oil, i.e., the pressure of making the lubricating oil flow into the horizontal hole 84 of the output shaft 41. Further, CP indicates the centrifugal hydraulic pressure attributed to travelling (rotation), i.e., the pressure of obstructing the flow of the lubricating oil into the horizontal hole 84.

As is obvious from FIG. 6, in the vehicle speed range lower than the boundary vehicle speed (a left side in FIG. 6), the supply head OH of the lubricating oil is greater than the centrifugal hydraulic pressure CP and respective components are lubricated. Specifically, the lubricating oil accumulated in the first oil accumulating part P1 is directed to the clearance G2 through the fourth to ninth holes 74 to 79. Further, the lubricating oil is directed from the clearance G2 to the clearance G1 of the second oil accumulating part P2 through the second spline 41b. The lubricating oil in the clearance G1 then flows through the horizontal hole 84 by means of the supply head, and is further supplied to the spline engaged part, the slide part and further a group of the plural brake plates 55 of the parking brake 25 through the first and second vertical holes 85a and 85b.

On the other hand, when the vehicle speed becomes greater than or equal to the boundary vehicle speed (a right side in FIG. 6), the centrifugal hydraulic pressure CP becomes greater than the supply head OH of the lubricating oil. The lubricating oil in the clearance G1 is herein moved to the outer peripheral part, and thereby, the lubricating oil no longer exists in the center part of the clearance G1 and the horizontal hole 84. Therefore, respective components are not lubricated in the vehicle speed range.

It should be noted that in the vehicle speed range greater than or equal to the boundary vehicle speed, the lubricating oil is scattered to respective components by rotary members such as gears. Further, the lubricating oil, forcibly supplied to the input part 23, is also scattered within the cases 21 and 22. Thus scattered lubricating oil is accumulated in the first oil accumulating part P1. The lubricating oil, accumulated in the first oil accumulating part P1 in the vehicle speed range greater than or equal to the boundary vehicle speed, is used for lubricating the respective components of the output part 24 in the low speed range lower than the boundary vehicle speed.

In the shaded time ranges of FIG. 5, the respective components of the output part 24 are lubricated by the lubricating oil accumulated in the first and second oil accumulating parts P1 and P2.

Features (1) The respective components of the output part 24 and the parking brake 25 are lubricated by utilizing a characteristic work form of a wheel loader. Therefore, the lubricating oil can be sufficiently supplied to positions not easily supplied with the lubricating oil by means of natural lubrication.

(2) The first oil accumulating part P1 is formed with use of the inner walls of the cases 21 and 22. Therefore, the first oil accumulating part P1 can be formed with a simple structure.

(3) The first oil accumulating part P1 and the second oil accumulating part P2 are communicated through the oil paths formed in the rear case 22, the housing 51 of the parking brake 25 and etc. Therefore, a piping is not required for making the both oil accumulating parts communicate with each other.

(4) The second oil accumulating part P2 is formed by utilizing the clearance G1 residing at the shaft end of the output shaft 41. Therefore, a special space is not required.

OTHER EXEMPLARY EMBODIMENTS

The present invention is not limited to the exemplary embodiment as described above, and a variety of changes or modifications can be herein made without departing from the scope of the present invention.

(a) In the aforementioned exemplary embodiment, the output part of the transmission is configured to be lubricated. However, a similar lubrication structure can be also applied to the other mechanisms including the intermediate shaft and etc.

(b) The structures of the first and second oil accumulating parts P1 and P2 are not limited to those of the aforementioned exemplary embodiment. The oil accumulating parts may be formed by utilizing other spaces, recesses and etc.

(c) The lubricating oil paths are not limited to the vertical holes 85a and 85b in the aforementioned exemplary embodiment. The lubricating oil paths may be clearances and etc. formed among the respective members.

In the transmission for a wheel loader of the illustrated embodiments, lubricating oil can be sufficiently supplied to respective components by means of natural lubrication utilizing gravity.

The invention claimed is:

1. A wheel loader comprising:
an engine;
a working unit configured to be driven by a pressurized oil produced by driving of the engine;
a transmission including a case, an output shaft disposed on a bottom part of the case, and a lubricated part disposed on an outer peripheral part of the output shaft, the transmission being configured and arranged to execute switching between forward travelling and rearward travelling and gear shifting, the transmission further including
a first oil accumulating part disposed above the lubricated part and having a predetermined length along an axial direction of the output shaft, the first oil accumulating part accumulating a scattered lubricating oil,
an output flange spline-engaged with an end of the output shaft,
a second oil accumulating part disposed below the first oil accumulating part and formed by an shaft end space formed between an end surface of the end of the output shaft and a cap, the cap being fixed to the output flange and disposed axially away from the end surface of the output shaft at a predetermined clearance, the second oil accumulating part accumulating the lubricating oil from the first oil accumulating part,
a communication oil path formed in the case and allowing the first oil accumulating part and the second oil accumulating part to communicate with each other,
a horizontal hole formed in a center part of the output shaft and extending axially, the horizontal hole communicating with the second oil accumulating part, and
a lubrication oil path having a vertical hole, the vertical hole being formed in the output shaft and extending radially from an outer peripheral surface of the output shaft, the lubricating oil path communicating with the horizontal hole,
the lubrication oil path being configured to direct the lubricating oil accumulated in the second oil accumulating part to the lubricated part when the output shaft is rotated at a rotational speed lower than a predetermined rotational speed.

2. The wheel loader recited in claim 1, wherein
the transmission further includes a parking brake attached to a lateral part of the case, the parking brake spline-engaged with the output shaft, and
the vertical hole allows the horizontal hole and a spline engaged part of the parking brake to communicate with each other.

3. The wheel loader recited in claim 1, wherein
the first oil accumulating part is integrally formed with an inner wall of the case and forms a U-shaped cross section together with the inner wall.

4. The wheel loader recited in claim 1, wherein
the transmission further includes an input mechanism, the input mechanism having a rotary shaft and a gear above the output shaft, the input mechanism supplied with the lubricating oil, and
the first oil accumulating part accumulates a scattered oil from the input mechanism and a scattered oil upwardly stirred from the case bottom part.

* * * * *